(12) United States Patent
Trim et al.

(10) Patent No.: US 10,984,028 B2
(45) Date of Patent: Apr. 20, 2021

(54) TEMPORAL SENSITIVE COGNITIVE INTERFACE

(71) Applicant: INTERNATIONAL BUSINESS MACHINES CORPORATION, Armonk, NY (US)

(72) Inventors: Craig M. Trim, Ventura, CA (US); Gandhi Sivakumar, Bentleigh (AU); Rashida Hodge, Ossining, NY (US); Victor Povar, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/202,547

(22) Filed: Nov. 28, 2018

(65) Prior Publication Data
US 2020/0167377 A1    May 28, 2020

(51) Int. Cl.
*G06F 16/33*   (2019.01)
*G06F 16/338*   (2019.01)

(52) U.S. Cl.
CPC ........ *G06F 16/3334* (2019.01); *G06F 16/338* (2019.01); *G06F 16/3344* (2019.01)

(58) Field of Classification Search
CPC . G06F 16/3334; G06F 16/3344; G06F 16/338
See application file for complete search history.

(56) References Cited

U.S. PATENT DOCUMENTS 7,577,651 B2   8/2009  Jones
8,117,640 B1*  2/2012  Moriconi ............. H04L 63/102
                                                                726/1
9,519,686 B2   12/2016 Bufe, III
2006/0149695 A1*  7/2006  Bossman ............. G06F 16/221
                                                                706/48
2006/0199287 A1*  9/2006  Fu ...................... G01N 21/9501
                                                                438/16
2006/0248073 A1   11/2006  Jones
(Continued)

OTHER PUBLICATIONS

Laskowski, Detection of light sources in digital photographs, Institute of Computer Graphics Technical University of Szczecin, Szczecin, Poland, 2018, entire document.
(Continued)

*Primary Examiner* — James Trujillo
*Assistant Examiner* — Michal Bogacki
(74) *Attorney, Agent, or Firm* — Patrick J. Daugherty; Daugherty & Del Zoppo Co., LPA

(57) ABSTRACT

Embodiments provide a temporal sensitive cognitive interface that determines whether a temporal data value of a response to a user query is fixed or variable over time; determine a time lapse from a current time to a time of generation of a variable one of the temporal data values; generate a first presentation of the response to the user that includes a (first) text word modifier that indicates a quality of certainty of the temporal data value in response to determining that the time lapse does not exceed a confidence threshold that is specified for an attribute of the response temporal data value; and generate another, different (second) presentation of the response to the user that includes a different (second) text word modifier that indicates a quality of uncertainty of the temporal data value in response to determining that the time lapse exceeds the confidence threshold.

17 Claims, 5 Drawing Sheets

(56) References Cited

U.S. PATENT DOCUMENTS

| | | | | |
|---|---|---|---|---|
| 2013/0097607 A1* | 4/2013 | Lewis | ............... | G06F 9/4881 |
| | | | | 718/102 |
| 2014/0280203 A1* | 9/2014 | Clark | ............... | G06F 16/3344 |
| | | | | 707/748 |
| 2014/0280253 A1* | 9/2014 | Clark | ............... | G06F 16/9574 |
| | | | | 707/755 |
| 2014/0310714 A1* | 10/2014 | Chan | ............... | G06F 9/4881 |
| | | | | 718/102 |
| 2015/0012510 A1* | 1/2015 | van der Laan | ...... | G08G 1/0141 |
| | | | | 707/702 |
| 2015/0120383 A1* | 4/2015 | Bennah | ............ | G06Q 30/0202 |
| | | | | 705/7.31 |
| 2016/0328457 A1 | 11/2016 | Cooper | | |
| 2017/0180221 A1 | 6/2017 | Appel | | |
| 2018/0047294 A1* | 2/2018 | Esposito | ............ | H04B 7/18506 |
| 2018/0081628 A1 | 3/2018 | Bajekal | | |

OTHER PUBLICATIONS

Mell et al., "The NIST Definition of Cloud Computing", Recommendations of the National Institute of Standards and Technology, U.S. Department of Commerce, Sep. 2011, entire document.

Pustejovsky, et al., The TIMEBANK Corpus, 2018, entire document, http://ucrel.lancs.ac.uk/publications/cl2003/papers/pustejovsky.pdf.

Radinsky, et al., A Word at a Time: Computing Word Relatedness using Temporal Semantic Analysis, WWW 2011—Session: Semantic Analysis, Mar. 28-Apr. 1, 2011, Hyderabad, India, entire document, www.semanticscholar.org/paper/A-word-at-a-time%3A-computing-word-relatedness-using-Radinsky-Agichtein/15fcecf899acf594ebb7b04ba2df49aa4adc4799.

Strötgen, et al., Multilingual and cross-domain temporal tagging, Lang Resources & Evaluation, 2013, vol. 47, Springer Science+Business Media B.V. 2012, entire document, https://pdfs.semanticscholar.org/3425/dcafb9feb477325aa4983018741acb0d4369.pdf.

* cited by examiner

TEMPORAL SENSITIVE COGNITIVE INTERFACE

BACKGROUND

Cognitive interface modeling refers to an area of computer science that deals with simulating human problem-solving and mental processing in a computerized model that engages a user in a human-like fashion, to improve the quality of human-computer interaction. Cognitive interface models may respond to user inputs with outputs generated by simulating or predicting human behavior or performance on tasks as a function of determining similarities to modeled tasks.

Cognitive interfaces are used within cognitive machine or artificial intelligence (AI) applications, and examples include expert systems, natural language processing, neural networks, robotics and virtual reality applications. Some cognitive machines incorporate "neural networks" that are designed to work similarly to the human brain by running training data through a large number of "artificial neuron" computational nodes that pass information back and forth between each other. Neural network applications may process large numbers of examples of training data (thousands, millions, etc.) to train the neural network to make predictions regarding outputs from similar data inputs, and thereby, to make inferences about topic areas upon which they are trained.

SUMMARY

In one aspect of the present invention, a computerized method includes executing steps on a computer processor. Thus, a computer processor is configured to determine whether a temporal data value of a response to a user query is fixed or variable as a function of time. In response to determining that the temporal data value is variable as a function of time, the configured processor determines a time lapse from a current time to a time of generation of the temporal data value, and determines whether the time lapse exceeds a confidence threshold that is specified for an attribute of the response temporal data value. In response to determining that the time lapse does not exceed the confidence threshold, the configured processor generates a first presentation of the response to the user that includes a (first) text word modifier that indicates a quality of certainty of the temporal data value; and in response to determining that the time lapse exceeds the confidence threshold, generates another, different (second) presentation of the response to the user that includes a different (second) text word modifier that indicates a quality of uncertainty of the temporal data value.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine whether a temporal data value of a response to a user query is fixed or variable as a function of time. In response to determining that the temporal data value is variable as a function of time, the configured processor determines a time lapse from a current time to a time of generation of the temporal data value, and determines whether the time lapse exceeds a confidence threshold that is specified for an attribute of the response temporal data value. In response to determining that the time lapse does not exceed the confidence threshold, the configured processor generates a first presentation of the response to the user that includes a (first) text word modifier that indicates a quality of certainty of the temporal data value; and in response to determining that the time lapse exceeds the confidence threshold, generates another, different (second) presentation of the response to the user that includes a different (second) text word modifier that indicates a quality of uncertainty of the temporal data value.

In another aspect, a computer program product for a temporal sensitive cognitive interface has a computer-readable storage medium with computer readable program code embodied therewith. The computer readable program code includes instructions for execution which cause the processor to determine whether a temporal data value of a response to a user query is fixed or variable as a function of time. The processor is caused to determine a time lapse from a current time to a time of generation of the temporal data value in response to determining that the temporal data value is variable as a function of time, and to determine whether the time lapse exceeds a confidence threshold that is specified for an attribute of the response temporal data value. The processor is caused to generate a first presentation of the response to the user that includes a (first) text word modifier that indicates a quality of certainty of the temporal data value in response to determining that the time lapse does not exceed the confidence threshold; and to generate another, different (second) presentation of the response to the user that includes a different (second) text word modifier that indicates a quality of uncertainty of the temporal data value, in response to determining that the time lapse exceeds the confidence threshold.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
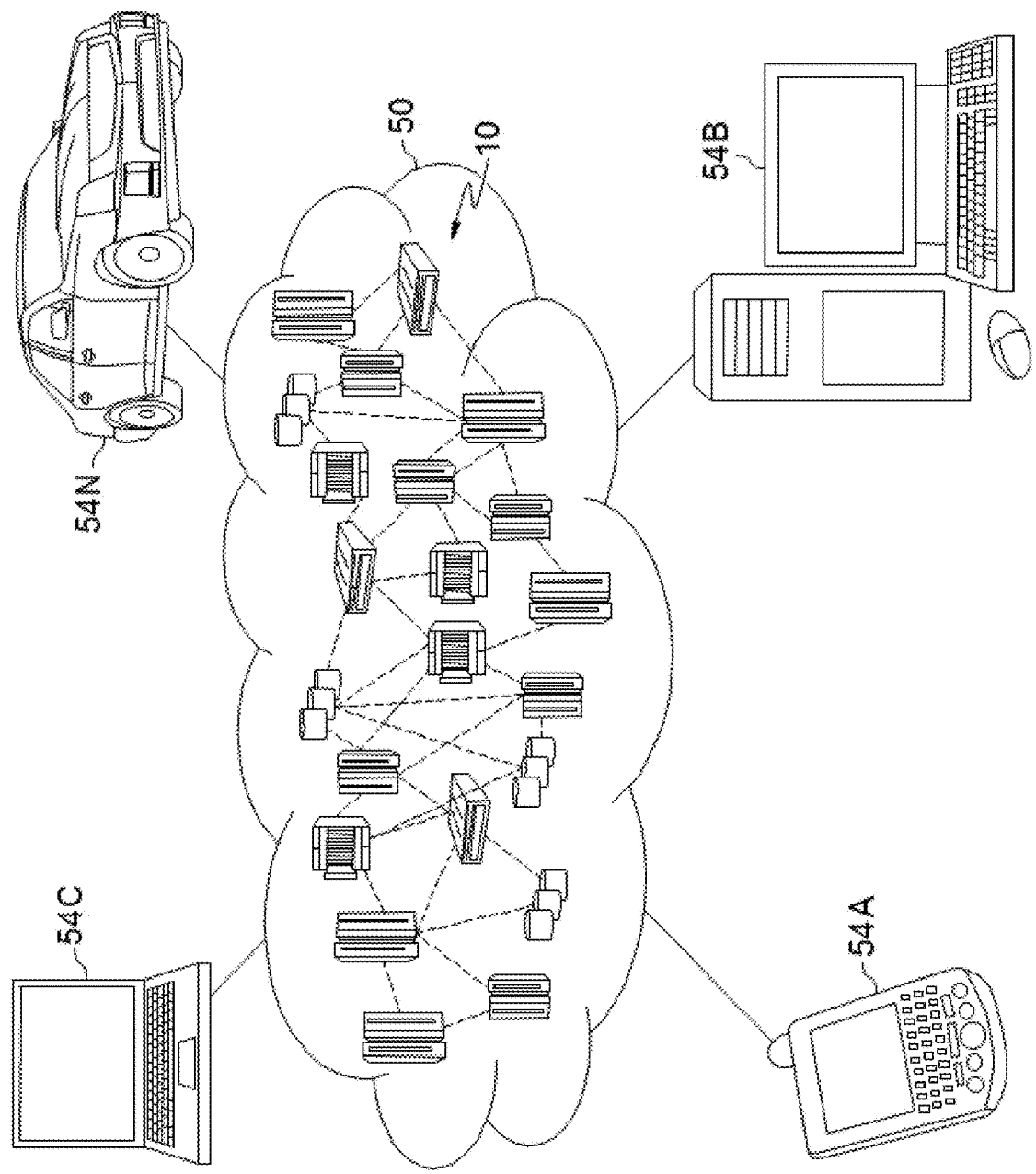
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
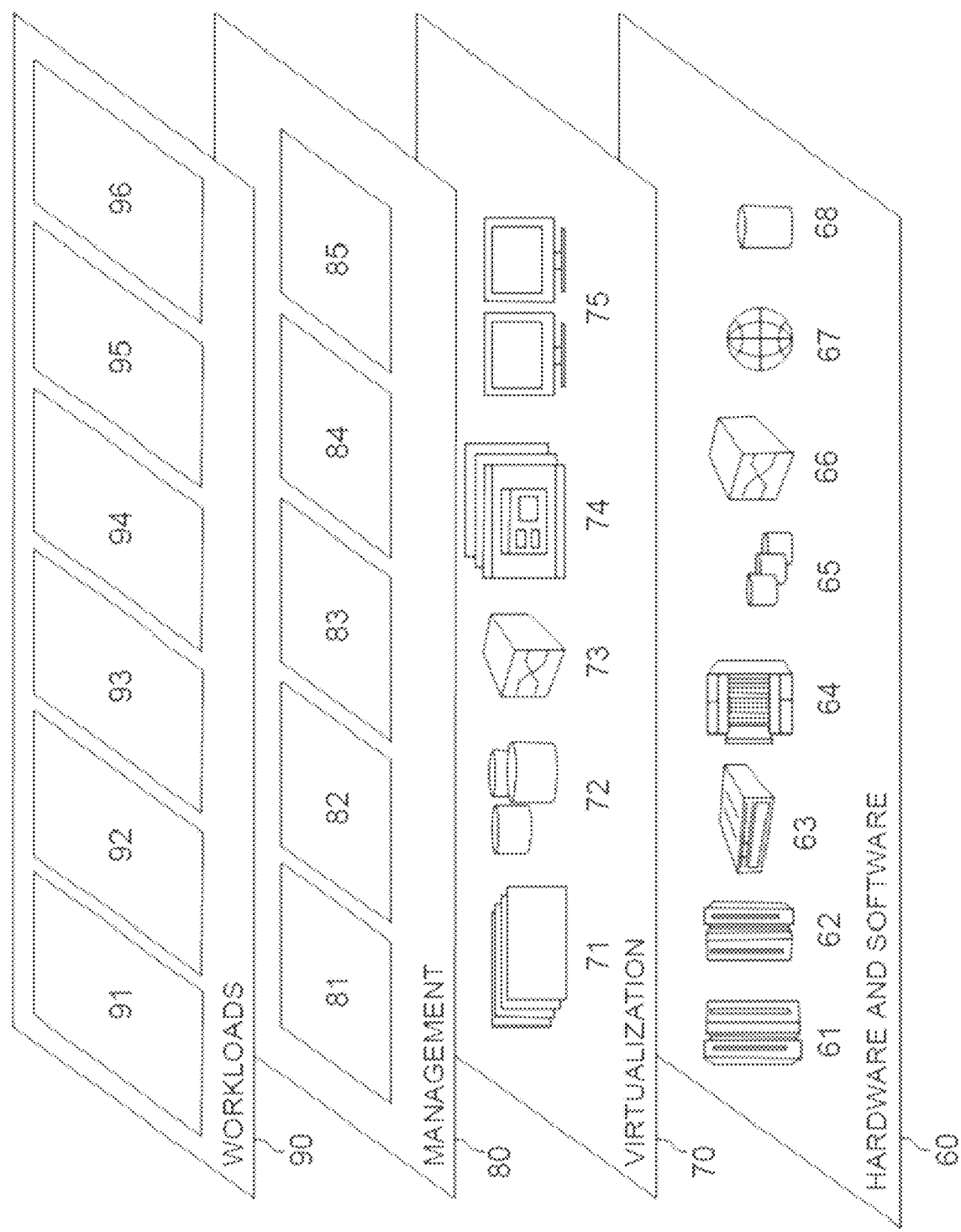
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a temporal sensitive cognitive interface according to aspects of the present invention 96.

Figure 3:
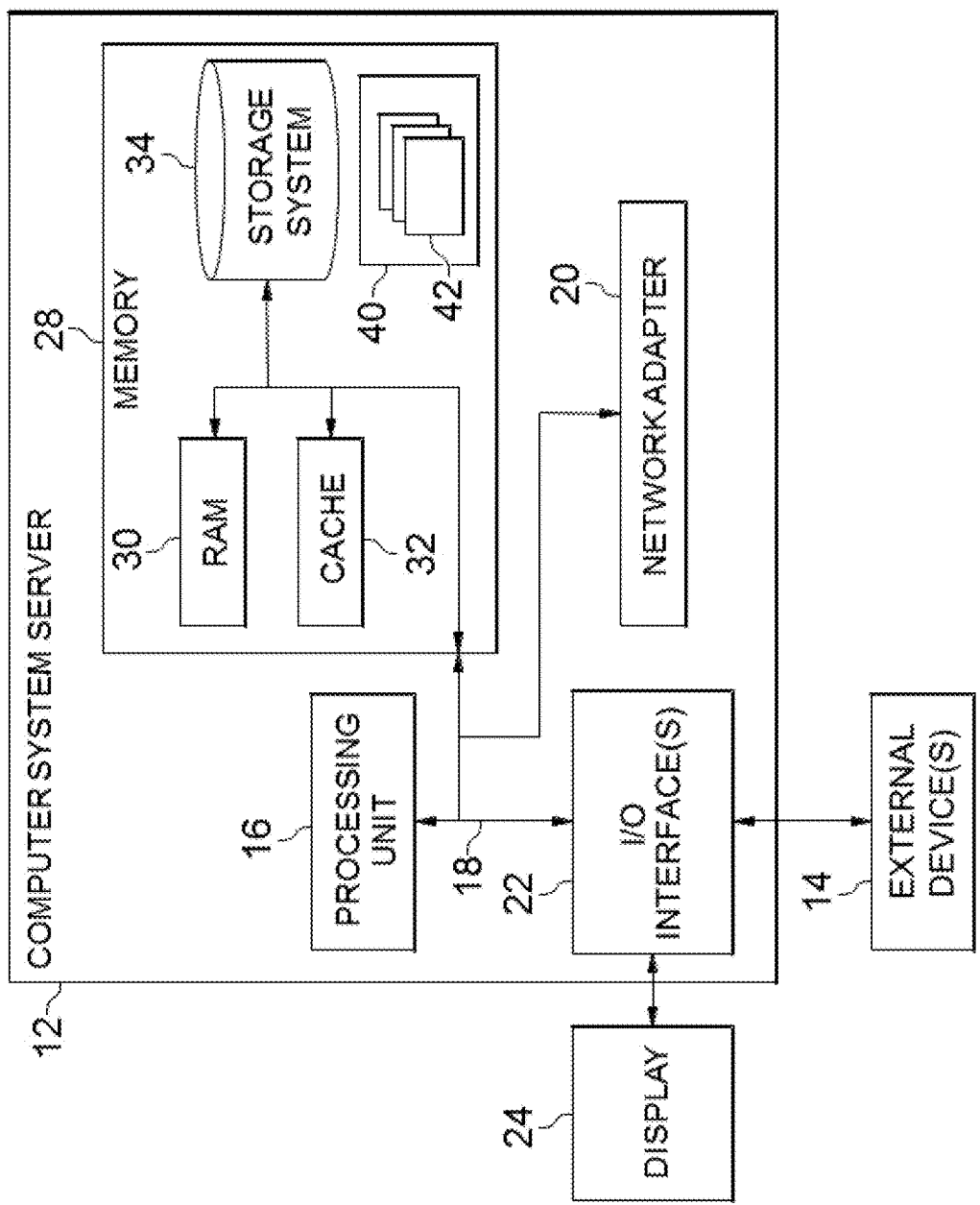
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
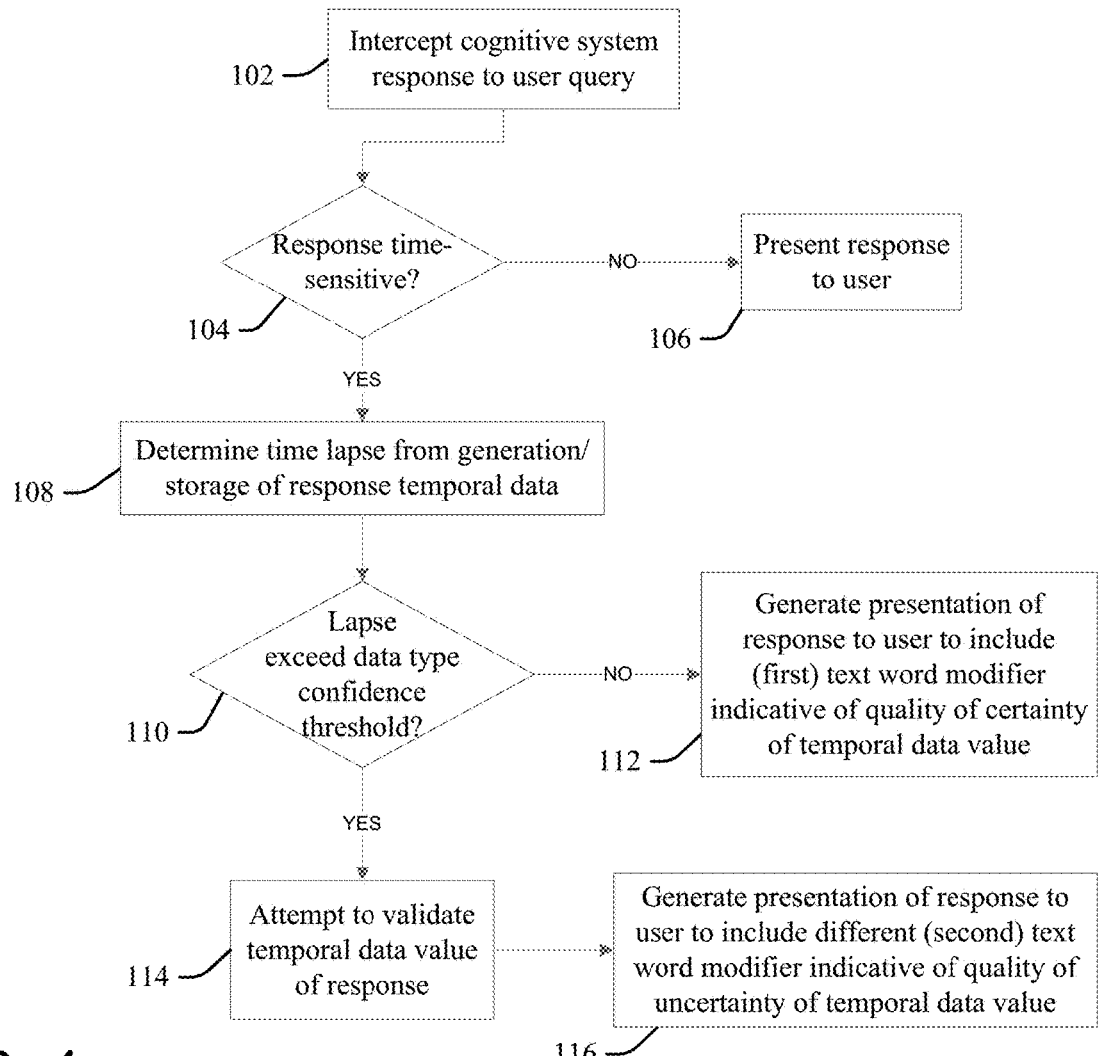
FIG. 4 is a flow chart illustration of an embodiment of the present invention.

FIG. 4 illustrates a temporal sensitive cognitive interface process or system according to the present invention. At 102 a processor that is configured according to the present invention (the "configured processor") intercepts a response returned from a cognitive system to satisfy a user query before presentation to the user, and at 104 determines whether the response includes a temporal data value that is time-sensitive: more particularly, whether the temporal data value is fixed, or it is variable, subject to change over time.

In response to determining at 104 that the temporal data value is fixed (unchanging) over time, at 106 the configured processor presents the response to the user. Examples of user presentations include driving a graphical user interface (GUI) display device to present a text rendering of the response data to reflect a value of the temporal data as fixed or certain, and driving a speaker of user device to render a spoken-word recitation of the response text.

In response to determining at 104 that the temporal data value is not fixed, but is mutable or subject to change over time, at 108 the configured processor determines a time lapse value starting from a current time from the generation or storage of the temporal data value used in generating the response, and at 110 determines whether the time lapse exceeds a confidence threshold that is specified for a type or attribute of the response temporal data value.

In response to determining at 110 that the time lapse does not exceed the confidence threshold for the response value temporal data type/attribute, the configured processor generates textual information for presentment of response data to the user in satisfaction of the query at 112 that includes one or more (first) text words that convey an extent of certainty of the temporal data value: for example, that the value is fixed or certain (for example, "A is B"), or fixed or certain at the current time (for example, "A is currently B"), or fixed and certain for a specified time period (for example, "A is B until 2019"), etc.

In response to determining at 110 that the time lapse exceeds the confidence threshold for the response value type/attribute, at 114 the configured processor attempts to validate the temporal data value of the response (for example, performs an additional search, or retrieves additional response data to verify the temporal data value, etc.), and at 116 generates textual information for presentment of the response data to the user in satisfaction of the query at 112 that includes one or more different (second) text word(s) that conveys a quality or extent of uncertainty of the temporal data value (including as a function of the validation process at 114): for example, for example, that the value is uncertain (for example, "A may or may not be B"), or uncertain at the current time (for example, "A was recently B, current status is unknown"), or uncertain for a specified time period (for example, "A was B from 2001 through 2017, but no information available for 2018"), etc. Thus, at 116 the configured processor presents the query response to the user, wherein the presentation includes a different verb form, modifier, etc., relative to the presentation at 112 that conveys to the user a (different) amount or quality of certainty or uncertainty of the temporal data value.

Figure 5:
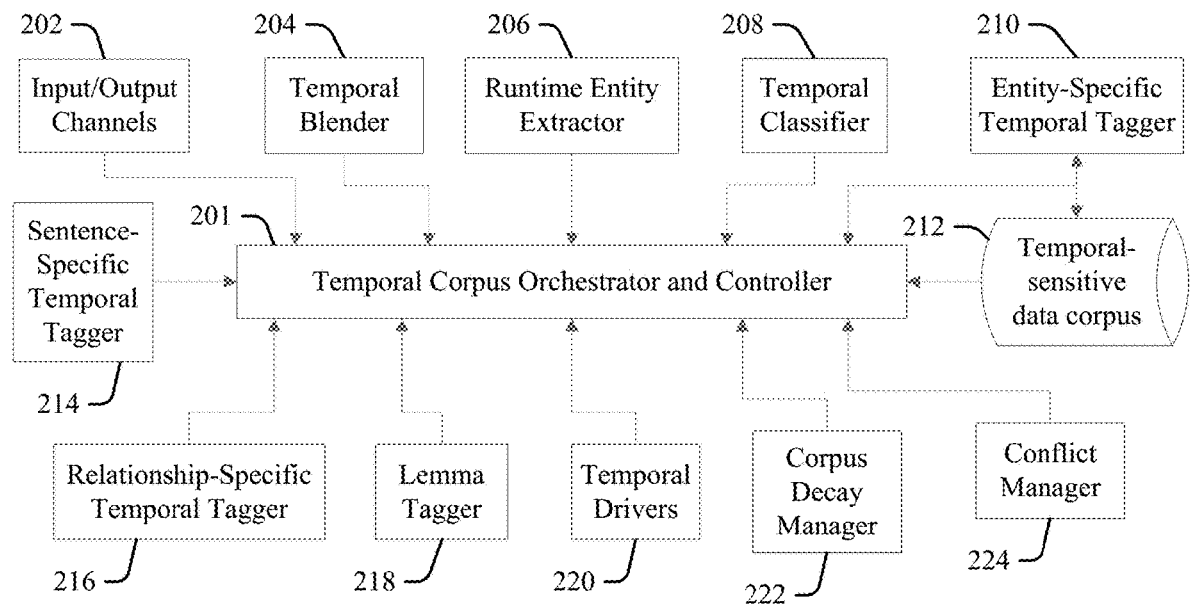
FIG. 5 is a block diagram illustration of an embodiment of the present invention.

FIG. 5 is a block diagram illustration of an embodiment according to the present invention. A Temporal Corpus Orchestrator and Controller 201 acts a central bus and arbitrates the values of outputs of other components to generate a text word presentation of the query response in output to a user query input (at 106, 112 or 116 of FIG. 4).

Input/Output Channels 202 interact with the other components of the embodiment to enable the embodiment to understand questions and other utterances of a user as usable data that is processed as input data to determine and return an appropriate answer. Input channels feed in text questions or other utterances from an end user, such as typed text queries or spoken queries that are input to a speech-to-text process that converts audio speech data into input text data. Output channels return temporal sensitive answers to a user (including from a Temporal Blender component 204 described below) as audio data via a text-to-speech process or facility, text data, non-text image elements or visual representations (images, icons, etc.) that have semantic meaning to the user (for example, a red, octagonal roadway stop sign, signifying an immediate and total stop, a light bulb image signifying that an associated response is likely a good or high-rated idea, etc.).

A Runtime Entity Extractor 206 parses query text-based data included within, or identified from processing, a user question or utterance input to identify specific entities that define subjects or objects of the user query (for example, identifying "Barack Obama" as a former President of the United States.)

A Temporal Classifier 208 parses the query text-based data to identify elements or values of the query, or response returned in satisfaction of the query, for temporal elements having values that may be time dependent or sensitive, for example, via using natural language processing (NLP) components or classification algorithms.

The Temporal Blender for Cognitive Interface 204 validates, or revises answer or other query response text elements, using NLP processing to generate response text that reflects or indicates temporal-sensitive determination outputs, including to present a response to a user indicating certainty of the temporal data at 112 of FIG. 4, or uncertainty of the temporal data at 116 of FIG. 4. The Temporal Blender 204 thus provides temporal context to questions or utterances and their respective extracted entities and temporal elements.

The Entity-Specific Temporal Tagger 210 parses documents of a data source corpus used for searching and otherwise generating a query response at a word or sub-sentence level for entities and related temporal attributes, wherein outputs are stored in a Temporal-sensitive data corpus 212 (database, indexed memory resource, etc.) for use and reference when answering questions or utterances, including by the Runtime Entity Extractor 206. Thus, embodiments identify an entity that is related to the response temporal data value and store the identified entity in a temporal-sensitive data corpus in relation to the response temporal data value, for use in satisfying additional queries by the user that are related to the response temporal data value.

A Sentence-Specific Temporal Tagger 214 parses corpus documents at a sentence level for temporal elements not related to entities, which are stored in the Temporal-sensitive corpus 212 for use or reference in generating responses to user questions or other speaker utterances.

A Relationship-Specific Temporal Tagger 216 parses corpus documents for relationship-based temporal elements (for example, relationships between people, organizations, or other entities) and stores the outputs in the Temporal-sensitive corpus 212 for use or reference in generating responses to user questions or other speaker utterances.

A Lemma Tagger for temporal entities 218 parses discovered entities and related temporal attributes for possible entity lemmas that may be used to generating a response. The terms "lemma" refers to a canonical, dictionary or citation form of a "lexeme" set of related forms of a word, wherein each of the word forms have a common same meaning but differ as to temporal tense (past, present or future), subject or object conjugation, or possessive use, etc. For example, "run" may be the lemma for a lexeme set of "run, runs, ran and running."

Temporal Drivers 220 and Corpus Decay Manager 222 components enable the embodiment to determine whether input or output data is temporal, as well as a degree to which information data may be temporal, and/or reliable. Thus, the Temporal Drivers component 220 enables embodiments to identify and distinguish key drivers that affect the values of temporal nature for different types of temporal information. For example, the embodiment may apply different confidence thresholds in determining whether a subject employment status remains (certainly or likely) unchanged over a given time period, based on differences in subject geographic location or education level driver values.

The Corpus Decay Manager 222 enables embodiments to determine an information decay rate or probability for a given type of question or response information data, including in correlation to (as a function of) specific key drivers identified by the Temporal Drivers component 220 for each unique type of temporal information. For example, the Corpus Decay Manager 222 enables embodiments to determine (recognize) that a data value for a "Date of Birth" for a person is (most likely) static and unchanging over time, forever; that a "current age" of a person is highly dynamic on a macro (24 hour time period) basis level and dependent upon the time and date of the query, or the presented answer, but is unchanged within the base (24-hour) inquiry level, wherein one response should satisfy other queries for that same base-level time period; and that a pressure value for a physical component is highly dynamic on a micro (a real-time) level, that the pressure may rapidly or otherwise change continually, so that a response is only certain for the specific time of acquisition (for example, 36.04 pounds per square inch @ 10:04:34 hours/seconds on May 5, 2018), wherein any given inquiry is likely to have a different time for inquiry or satisfaction, and therefore the determination must be repeated for each inquiry that differs by more than one second in time.

Returning to the example of determining a subject employment status, embodiments may use the Temporal Drivers component 220 and the Corpus Decay Manager 222 to determine how long subjects tend to remain employed by identifying employee retention rate data associated with a geographic location, area of employment, job, title or other key driver, and apply this rate to current the duration of the employment of the subject in order to determine a confidence for a reported employment status of the subject person. Some embodiments identify or determine decay rates and other decay information for specific temporal sensitive data within the Corpus Decay Manager 222 as a function (in conjunction or combination with) key drivers for the data identified by the Temporal Drivers component 220.

A Conflict manager 224 resolves conflicting information across different sources which cannot be accounted for through key drivers for the relevant type of information. Embodiments review conflicting analyses to identify the source data or values used to generate conflicting outputs, determined which key driver or data sources or respective values occur more or most frequently in the conflicts. Embodiments generally decrease respective driver weightings or confidence levels as used in determining whether a time lapse value exceeds a confidence threshold for each of a plurality of different query responses for attributes of the response temporal data values for use in subsequent iterations, in proportion to said observed frequencies.

Some embodiments of the present invention analyze, and track representations preferred by users for receiving each type of analyzed temporal information, and thereby select and utilize the most frequently used (popular) methods to present query response information to the end user.

In application of the system of FIG. 5, a run-time temporal Natural Language parser intercepts a query response (at 102, FIG. 4), determines a current time (and optionally location) of the query and/or response, and revises the response as necessary (at 112 or 116 of FIG. 4) to respond to the user in a sentence form having a natural, human-like and correct lemma form. More particularly, the embodiment chooses an appropriate verb form lemma as a function of the decay rate determined for the response data via the Corpus decay manager 222 for use with (in addition to) the relevant response data based on the information decay, and reflecting any value ambiguity or conflict arising from utilizing different sources; and presents the resulting response information in a medium that is most preferred, expected or natural for the user for the type of information being displayed.

In one example, in response to a user query input of "tell me about Barack Obama," an embodiment of the present invention returns the answer of "Obama was the 44th President of the United states of America. Obama enjoys doughnuts and hot tea during the winter", wherein:

the Lemma Tagger 218 determines that he is not the current President, so the verb form of "to be" is selected (tagged, flagged) to be "was" for use in the generated presentation statement phrase regarding his current presidential status (at the time of the query answer presentation);

the Corpus Decay Manager 222 determines that the rank-order of Obama with respect to other presidents (44th) is static and unchanging over time; and the Corpus Decay Manager 222 determines that a search result indicating that "Obama enjoys doughnuts and hot tea during the winter" is still valid, in response to determining that a time lapse since generation of the information is less than an average time for the occurrence of a dietary changes in the subject demographics (age, annual income, etc.), that no conflicting dietary results have been found that have equivalent or greater weight assigned by the Conflict Manager 224, and wherein the Temporal Corpus Orchestrator and Controller 201 responsively selects the appropriate form of the verb "enjoy" to be current and singular to Obama (" . . . enjoys doughnuts") as a function of tags or flags assigned or determined by the Lemma Tagger 218.

Some embodiments of the invention deliver multiple, potential results for highly dynamic types of temporal information, for example visualized in multiple, diverging pathways, such as a plurality of different curves plotted within a graphic presentation, wherein each curve shows a possible result value change over future time values.

It is generally desirable that cognitive interfaces interact with humans in a natural way, so that they are perceived as part of the human community while providing responsive outputs generated by AI and other complex processing. Prior teachings face challenges in identifying and processing time-sensitive elements at varying levels of abstraction. In contrast, embodiments of the present invention provide cognitive solutions that recognize the temporal aspects of query and response data and thereby respond to human interactions more appropriately than the prior art.

Embodiments provide a GUI-based corpus curation function that identifies and tags entities and other parts of human speech input data with temporal attributes, providing a temporal-sensitive corpus with which to ask or satisfy temporal based questions. Thus, cognitive interface embodiments of (or incorporating) the present invention identify time sensitive data value and elements at varying levels of abstraction and respond to humans with the relevant intelligence, while arbitrating conflicts and ambiguities from different sources and evaluating the correctness and/or confidence of a given model assignment or calculation for a given datum or corpus, including as a function of determining information decay attributes.

Aspects intelligently display temporal information by conveying the degree to which the information is temporal (highly volatile vs fairly stable vs static), and therefore a reliability or confidence of the data. For example, embodiments may display highly volatile information with respect to time on a time scale, graph or a bar; and, in ready visual contrast, static information in fixed, absolute or singular terms (for example, a sentence or phrase using certain lemma word forms), as a function of differences in relative degrees of confidence in a data source, temporal data value, key driver or related attribute, and/or in the base information statistics.

Like different decay rates of different elements found in nature, information quanta decay differently in terms of their efficacy or value, and information generally loses value over time. It is difficult in the prior art to predict or convey to a user when a particular information entity (for example, a set of data records) will lose its relevance or trustworthiness for a decisionmaker. For example, one skilled in the art of advertising or marketing will appreciate that the half-life associated with Gross Rating Point (GRP) values (the aggregate total or sum of viewer ratings) or Target Audience GRP (TRP) values (sum of ratings of a specific demographic segment) effects the reliability of the data over time. Accordingly, aspects of the present invention autonomously determine query result confidence values, and select appropriate lemma values and presentation formats, in response to leveraging the delayed effects observed from marketing campaigns, in response to measuring or estimating short and long-term effects on revenue and brand equity, and use these determinations to differentially display query results (at 106, 112 and 116 of FIG. 4).

Some information decay is akin to a step function: for example, an unqualified assertion such as "Barack Obama is the President of the United States" is at any one time either true or false. Thus, in response to determining that the time value exceeds the threshold for the data (that the timeframe of his presidency occurred before the current time of the query), some embodiments revise this statement (at 112 or 114, FIG. 4) as a function of selecting (tagging) a different lemma form verb of the verb "to be," and optionally add additional explanatory information in satisfaction of a predicted data requirement of this (or other similar or historic users) to generate an alternative statement for presentment to the user: "Barack Obama was the President of the United States from 2008 through 2016."

Some information may decay as an exponent function relative to the passage of time: for example, the value of quantitative data points such as the number of widgets on hand as of a certain date from an initial stocking date, or the current commuting time between home and work. The value of information may also increase over time: for example, confidence and reliability in an inflation rate reported for a nation in a given period, such as first quarter, 2018, improves over time as more corroborating data becomes available over time. Aspects of the present invention provide advantages over the prior art in accurately conveying the confidence or reliability, differentially accounting for, weights and present data values used in generating query responses, in direct response to (i) relative differences in information value changes over time, (ii) difference in confidences in the accuracy or correctness of the values or value changes, including as modelled, and (iii) differences in parameters or relative weights for the underlying functions, models or assumptions used to generate time-sensitive response values.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising executing on a computer processor:

determining, as a function of time, whether a temporal data value of a response to a user query is fixed or variable;

determining a time lapse from a current time to a time of generation of the temporal data value, in response to determining that the temporal data value is variable;

identifying a key driver element value within the query response that is associated to the response temporal data value;

determining a frequency of occurrence of the identified key driver value in a plurality of different iterations of determining whether the time lapse exceeds the confidence threshold for each of a plurality of different query responses, wherein the plurality of different iterations comprises a plurality of conflicting determinations as to whether the time lapse exceeds the confidence threshold;

decreasing, in proportion to the determined occurrence frequency, a weighting of the identified key driver value;

determining whether the time lapse exceeds a confidence threshold that is specified for the response temporal data value as a function of the decreased weighting of the identified key driver value;

in response to determining that the time lapse does not exceed the confidence threshold, generating a first presentation of the response to the user that comprises a first text word modifier that indicates that the temporal data value is certain; and in response to determining that the time lapse exceeds the confidence threshold, generating a second presentation of the response to the user that comprises a second text word modifier that indicates that the temporal data value is uncertain and is different from the first word modifier.

2. The method of claim 1, wherein the first and second text word modifiers are selected from a plurality of different lemmas of a root verb.

3. The method of claim 1, wherein the first and second text word modifiers are selected from a plurality of different image elements that have different semantic meaning to the user.

4. The method of claim 1, wherein the query response comprises a response plurality of text words, and wherein the determining whether the time lapse exceeds the confidence threshold that is specified for the response temporal data value comprises:
  parsing documents of a data source corpus searched in generating the query response at a word level to identify an entity that is related to the response temporal data value; and
  storing the identified entity in a temporal-sensitive data corpus in relation to the response temporal data value for use in satisfying additional queries by the user that are related to the response temporal data value.

5. The method of claim 1, wherein the determining whether the time lapse exceeds the confidence threshold that is specified for the response temporal data value comprises:
  determining an information decay rate for the key driver element; and
  determining whether the time lapse exceeds the confidence threshold as a function of applying the information decay rate to the time lapse.

6. The method of claim 1, further comprising:
  integrating computer-readable program code into a computer system comprising a processor, a computer readable memory in circuit communication with the processor, and a computer readable storage medium in circuit communication with the processor; and
  wherein the processor executes program code instructions stored on the computer-readable storage medium via the computer readable memory and thereby performs the determining whether the temporal data value of the query response is fixed or variable, the determining the time lapse, the identifying the key driver element value, the determining the frequency of occurrence of the identified key driver value, the decreasing the weighting of the identified key driver value, the determining whether the time lapse exceeds the confidence threshold, the generating a first presentation of the response to the user, and the generating the second presentation of the response to the user.

7. The method of claim 6, wherein the computer-readable program code is provided as a service in a cloud environment.

8. A system, comprising:
  a processor;
  a computer readable memory in circuit communication with the processor; and
  a computer readable storage medium in circuit communication with the processor;
  wherein the processor executes program instructions stored on the computer-readable storage medium via the computer readable memory and thereby:
  determines whether a temporal data value of a response to a user query is, as a function of time, fixed or variable;
  in response to determining that the temporal data value is variable as a function of time, determines a time lapse from a current time to a time of generation of the temporal data value;
  identifies a key driver element value within the query response that is associated to the response temporal data value;
  determines a frequency of occurrence of the identified key driver value in a plurality of different iterations of determining whether the time lapse exceeds the confidence threshold for each of a plurality of different query responses, wherein the plurality of different iterations comprises a plurality of conflicting determinations as to whether the time lapse exceeds the confidence threshold;
  decreases, in proportion to the determined occurrence frequency, a weighting of the identified key driver value;
  determines whether the time lapse exceeds a confidence threshold that is specified for the response temporal data value as a function of the decreased weighting of the identified key driver value;
  in response to determining that the time lapse does not exceed the confidence threshold, generates a first presentation of the response to the user that comprises a first text word modifier that indicates that the temporal data value is certain; and
  in response to determining that the time lapse exceeds the confidence threshold, generates a second presentation of the response to the user that comprises a second text word modifier that indicates that the temporal data value is uncertain and is different from the first word modifier.

9. The system of claim 8, wherein the first and second text word modifiers are selected from a plurality of different lemmas of a root verb.

10. The system of claim 8, wherein the first and second text word modifiers are selected from a plurality of different image elements that have different semantic meaning to the user.

11. The system of claim 8, wherein the query response comprises a response plurality of text words, and wherein the processor executes the program instructions stored on the computer-readable storage medium via the computer readable memory and thereby determines whether the time lapse exceeds the confidence threshold that is specified for the response temporal data value by:
  parsing documents of a data source corpus searched in generating the query response at a word level to identify an entity that is related to the response temporal data value; and
  storing the identified entity in a temporal-sensitive data corpus in relation to the response temporal data value for use in satisfying additional queries by the user that are related to the response temporal data value.

12. The system of claim 8, wherein the processor executes the program instructions stored on the computer-readable storage medium via the computer readable memory and thereby determines whether the time lapse exceeds the confidence threshold that is specified for the response temporal data value by:
  determining an information decay rate for the key driver element; and
  determining whether the time lapse exceeds the confidence threshold as a function of applying the information decay rate to the time lapse.

13. A computer program product for a temporal sensitive cognitive interface, the computer program product comprising:
- a computer readable storage medium having computer readable program code embodied therewith, the computer readable program code comprising instructions for execution by a processor that cause the processor to:
- determine whether a temporal data value of a response to a user query is, as a function of time, fixed or variable;
- in response to determining that the temporal data value is variable as a function of time, determine a time lapse from a current time to a time of generation of the temporal data value;
- identify a key driver element value within the query response that is associated to the response temporal data value;
- determine a frequency of occurrence of the identified key driver value in a plurality of different iterations of determining whether the time lapse exceeds the confidence threshold for each of a plurality of different query responses, wherein the plurality of different iterations comprises a plurality of conflicting determinations as to whether the time lapse exceeds the confidence threshold;
- decrease, in proportion to the determined occurrence frequency, a weighting of the identified key driver value;
- determine whether the time lapse exceeds a confidence threshold that is specified for the response temporal data value as a function of the decreased weighting of the identified key driver value;
- in response to determining that the time lapse does not exceed the confidence threshold, generate a first presentation of the response to the user that comprises a first text word modifier that indicates that the temporal data value is certain; and
- in response to determining that the time lapse exceeds the confidence threshold, generate a second presentation of the response to the user that comprises a second text word modifier that indicates that the temporal data value is uncertain and is different from the first word modifier.

14. The computer program product of claim 13, wherein the first and second text word modifiers are selected from a plurality of different lemmas of a root verb.

15. The computer program product of claim 13, wherein the first and second text word modifiers are selected from a plurality of different image elements that have different semantic meaning to the user.

16. The computer program product of claim 13, wherein the query response comprises a response plurality of text words, and wherein the computer readable program code instructions for execution by the processor further cause the processor to determine whether the time lapse exceeds the confidence threshold that is specified for the response temporal data value by:
- parsing documents of a data source corpus searched in generating the query response at a word level to identify an entity that is related to the response temporal data value; and
- storing the identified entity in a temporal-sensitive data corpus in relation to the response temporal data value for use in satisfying additional queries by the user that are related to the response temporal data value.

17. The computer program product of claim 13, wherein the computer readable program code instructions for execution by the processor further cause the processor to determine whether the time lapse exceeds the confidence threshold that is specified for the response temporal data value by:
- determining an information decay rate for the key driver element; and
- determining whether the time lapse exceeds the confidence threshold as a function of applying the information decay rate to the time lapse.

\* \* \* \* \*